United States Patent [19]

Clarke, Jr.

[11] 4,061,038
[45] Dec. 6, 1977

[54] MOSQUITO LARVAE DIPPER

[75] Inventor: John L. Clarke, Jr., Riverside, Ill.

[73] Assignee: Clarke Outdoor Spraying Co., Inc., Roselle, Ill.

[21] Appl. No.: 761,643

[22] Filed: Jan. 24, 1977

[51] Int. Cl.² .............................................. G01F 19/00
[52] U.S. Cl. .................................. 73/427; 220/94 R; 73/425.4 R
[58] Field of Search ............... 73/425.4 R, 426, 427; 220/94 R, 94 A, 90.2; D7/50, 104

[56] References Cited

U.S. PATENT DOCUMENTS

| | | | |
|---|---|---|---|
| 380,724 | 4/1888 | Langguth | 73/427 |
| 3,329,308 | 7/1967 | Pool | 73/DIG. 9 |
| 3,369,407 | 2/1968 | Hein | 73/427 |

*Primary Examiner*—Herbert Goldstein
*Attorney, Agent, or Firm*—Kinzer, Plyer, Dorn & McEachran

[57] ABSTRACT

A dipper for use in removing mosquito larvae from bodies of water includes a cup and a handle. The cup has a generally frusto-conic outer wall terminating in a laterally extending annular lip. There is a bottom integral with the frusto-conic outer wall. The annular lip and the adjacent areas of the upper portion of the wall form generally diammetrically opposed pouring grooves, which grooves extend below the level of the lip, with the lip being continuous in size and shape throughout the grooves. There is a handle support integral with the cup wall which extends outwardly from the wall and has a coaxially arranged cylindrical opening for mounting the handle.

4 Claims, 4 Drawing Figures

MOSQUITO LARVAE DIPPER

SUMMARY OF THE INVENTION

The present invention relates to dippers for removing mosquito larvae or the like from bodies of water and has particular relation to such a dipper having uniquely arranged and constructed pouring grooves on opposite sides of the cup portion of the dipper.

One purpose of the invention is an economically and reliably constructed dipper for the use described which facilitates pouring of the mosquito larvae into a container.

Another purpose is a pouring dipper having a support for various size handles.

Another purpose is a simply constructed molded plastic dipper for use in removing mosquito larvae from bodies of water and pouring the larvae, without spillage, into an adjacent container.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
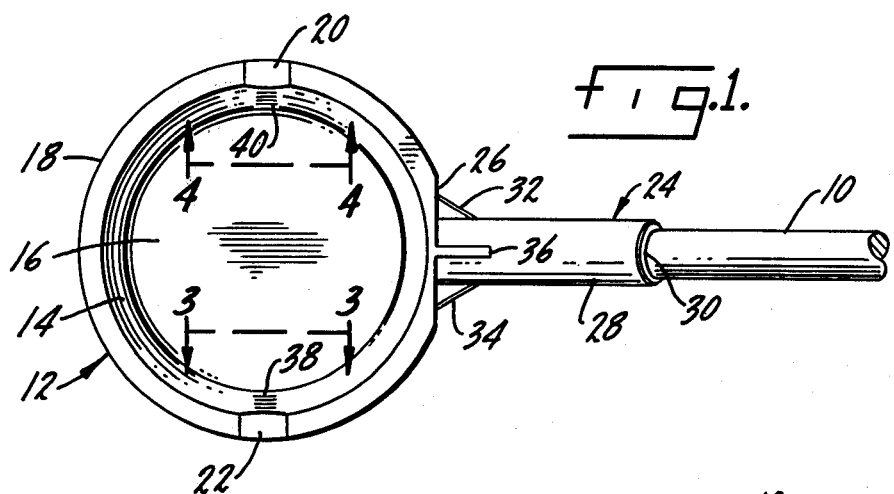
FIG. 1 is a top plan view of a dipper of the type described.
Figure 2:
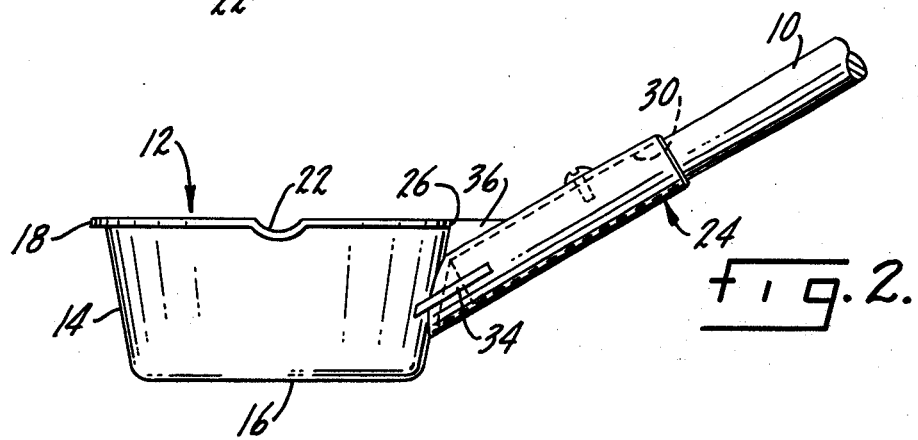
FIG. 2 is a side view of the dipper.

One of the steps in the control of mosquitoes in a given area is to periodically take samples of the number of mosquito larvae in stagnant bodies of water within the area, such as catch basins, small ponds or the like. Areas of stagnant water customarily are the preferred breeding areas for mosquitoes and the periodic sampling of these areas provides an indication of when the areas should be sprayed with mosquito and larvae killing insecticide. Since the bodies of water to be sampled are not always easily accessible, it has been difficult at times to obtain a true sample of the larvae in the body of water without time consuming spillage of the sample and/or loss of all or part of it. The present invention provides an improved dipper for use in obtaining samples of mosquito larvae from bodies of water and has particular relation to such a structure having a long handle on a confined cup, with the cup including means for reliably pouring its contents into a suitable container for transport to a laboratory.

In the drawing a handle is indicated at 10 and may be of various lengths. A 3-foot handle is satisfactory for some situations, but the handle may be longer or shorter. A cup is indicated generally at 12 and includes a generally frusto-conic wall 14 having an integral bottom 16 and terminating in an outwardly-extending integral annular lip 18. There are a pair of diammetrically arranged pouring grooves 20 and 22 which are formed around the upper edge of cup 12 and are formed by depressions in annular lip 18 and the upper portions of wall 14. It should be noted that the annular lip is continuous in size and shape throughout the areas of the pouring grooves 20 and 22 to provide a more reliable means for pouring the contents from cup 12 into an adjacent container.

A handle support is indicated generally at 24 and it should be noted that annular lip 18 is discontinuous, as at 26, in the area adjacent the handle support. Handle support 24 may include a tubular portion 28 having a generally cylindrical opening 30 for mounting handle 10. A pair of support fillets 32 and 34 are positioned on diammetrically opposed sides of handle support 24 and are integral with the support and cup 12. A third fillet 36, also integral with the handle support and the cup, is positioned equally between fillets 32 and 34 and is generally arranged along a diameter of the cup.

Figure 3:
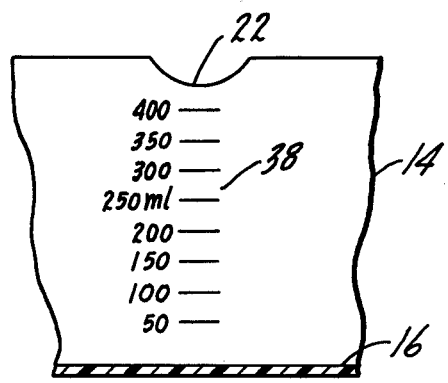
FIG. 3 is a partial side view of a portion of the cup, taken along plane 3—3 of FIG. 1, on an enlarged scale.
Figure 4:
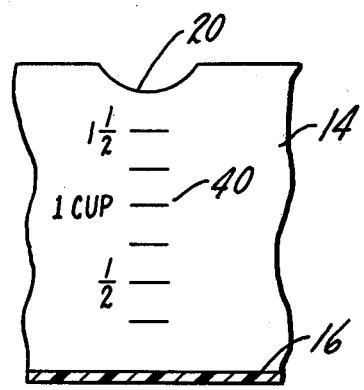
FIG. 4 is a partial side view of the cup, taken along plane 4—4 of FIG. 1, on an enlarged scale.

The entire cup structure including the cup itself and the handle support may be formed of a suitable plastic, for example, a high impact styrene. Preferably the cup will be molded in a single operation by any one of a number of commercially available molding machines. Preferably graduations, as indicated at 38 in FIG. 3, will be formed along one wall of the cup and preferably in alignment with pouring groove 22. The graduations 38 are in metric units, whereas, graduations 40, illustrated in FIG. 4 and formed on a diammetrically opposed portion of cup wall 14 are in English units.

In use, the dipper will be manipulated by an operator to obtain a suitable volume of mosquito larvae from a body of water, for example a catch basin, stagnant pond or the like. The graduations provide an easy indication of the volume of liquid within the cup. The uniquely arranged pouring grooves 20 and 22 providing full lip width throughout the grooves are necessary in order to insure that none of the larvae is spilled when the contents of the cup are poured into an adjacent container. Although the location of the graduations, and it is preferred that there be both metric and English graduations, is opposite the pouring grooves, this is not essential.

The unique arrangement for the handle support is highly advantageous in that it is simply constructed and yet provides a reliable and simply molded structure for securely holding the handle to the cup portion of the dipper.

Whereas the preferred form of the invention has been shown and described herein, it should be realized that there may be many modifications, substitutions and alterations thereto within the scope of the following claims.

The embodiments of the invention in which an exclusive property or privilege is claimed are defined as follows:

1. A dipper for use in removing mosquito larvae or the like from bodies of water including a cup and a handle, said cup having a generally frusto-conic outer wall terminating in a laterally extending integral annular lip, a bottom integral with said wall, said annular lip and the adjacent areas of the upper portion of said wall forming generally diammetrically opposed pouring grooves, said grooves extending below the level of said lip, with the lip being continuous in size and shape throughout said grooves, a handle support integral with said cup and extending outwardly from said cup wall, said handle support having a coaxially arranged cylindrical opening for mounting said handle, and a plurality of handle support fillets integral with said cup wall and handle support.

2. The structure of claim 1 further characterized in that there are three fillets, two of said fillets being on diammetically opposed sides of said handle support, with the third fillet being equally spaced from the first two.

3. The structure of claim 2 further characterized in that said annular lip is discontinuous in the area of said third fillet.

4. The structure of claim 3 further characterized by and including graduations formed on said frusto-conic wall, generally in alignment with one of said pouring grooves.

* * * * *